Patented Sept. 11, 1951

2,567,254

UNITED STATES PATENT OFFICE 2,567,254

PROCESS FOR PREPARING NITRILES AND PYRIDINES

John W. Teter, Chicago, Ill., assignor to Sinclair Refining Company, New York, N. Y., a corporation of Maine No Drawing. Application August 17, 1946, Serial No. 691,382

6 Claims. (Cl. 260—290)

This invention relates to a new process for the production of nitrogen-containing organic compounds, including aliphatic nitriles and heterocyclic nitrogen bases, in particular, pyridines.

In accordance with the present invention, such nitrogen-containing products are produced by the direct reaction between butadiene and ammonia at elevated temperatures and pressures in the presence of a reduced metal oxide catalyst effective to cause the ammonia to react with butadiene with the production of the nitrogen-containing products.

Catalysts which are effective for promoting the reaction between the butadiene and the ammonia at the elevated temperatures and pressures used are reduced metal oxide catalysts, in particular, cobalt and nickel and the reduction products of co-precipitates of cobalt and nickel oxides and oxides of metals which can or do form spinel type crystal structures with cobalt oxide, such as zinc, manganese, magnesium and iron.

Ordinarily, the catalytic material will be deposited on an inert carrier such as diatomaceous earth, heat treated magnesol, heat treated bentonite, titanium dioxide, or other inert material, and will be used in the form of granules or pellets. The catalytic metal or metals may be promoted by the use of small quantities of sodium or other promoter, and will advantageously have low contents of sulphate and chloride. My application Serial No. 605,832, filed July 18, 1945, now abandoned, which describes the catalytic reaction of olefins with ammonia and certain catalysts particularly adapted for promoting that reaction, and such catalysts may be used with advantage in the practice of the process of this application. Similarly, my Patent 2,520,181, issued August 29, 1950, which relates to what I term spinel-type catalysts useful for promoting the reaction between olefins and ammonia, describes catalysts which may be used with advantage in the practice of the present invention.

Catalysts which are used in the practice of the present invention are advantageously prepared in the form of small agglomerates or pellets, as by pelleting or extrusion, after the deposition of the metal, in the form of its oxide or the like, on the inert carrier, such as diatomaceous earth, deactivated magnesol, deactivated bentonite, or the like. The catalytic metal, e. g., cobalt, or nickel, or a mixture of cobalt or nickel with another metal, is deposited on a carrier as by reaction of a soluble cobalt or other metal salt with caustic soda or sodium carbonate in the presence of the slurried carrier after which the product is washed, ignited and reduced. Ordinarily, pelleting is carried out between the ignition and the reduction steps, and the final reduction is carried out in the reaction vessel, because the final reduced catalyst will ordinarily be pyrophoric.

In carrying out the new reaction, the preheated butadiene and ammonia are advantageously passed through a bed of the catalyst in pellet or agglomerated form at the elevated temperatures and pressures which favor the reaction. The reaction appears not to take place at temperatures below about 500° F. and does not appear to take place with substantial velocity below temperatures of about 550° F. Optimum temperatures for the reaction are about 625–650° F., but the reaction proceeds at higher temperatures, for example, at 700° F. and even somewhat higher. At these higher temperatures, however, increased side reactions, including cracking, polymerization and formation of tarry material and carbonaceous material take place to a pronounced extent, and interfere with the reaction both by causing losses of the butadiene and fouling the catalyst and reducing its activity. One of the major advantages of the cobalt-containing catalysts is that they favor the reaction between the ammonia and the butadiene in the temperature range indicated above without causing undue pyrolytic decomposition reactions of the hydrocarbon with the production of hydrocarbon polymer and tarry and carbonaceous material, giving a large yield of nitrogen-containing products with minimum hydrocarbon polymer or tar and with reasonable prolonged catalytic activity before regeneration is required.

The new process is carried out at elevated pressures, for example, at pressures above 500 lbs. per square inch, advantageously above 1000 lbs. per square inch. The upper limit of pressure is largely a matter of practical considerations of providing suitable high pressure equipment, and for that reason, pressures in excess of 3000 to 4000 lbs. per square inch will ordinarily not be used. Pressures of 1500 lbs. per square inch give good results.

In practicing the invention, it is advantageous to use a large excess of ammonia, for example, from 5 to 15 molar proportions of ammonia for each molar proportion of butadiene. The use of a large excess of ammonia not only favors the production of nitrogen-containing products which are desired products of the reaction, but also tends to repress the pyrolytic decomposition reactions of the hydrocarbon itself. While lower or higher ratios of ammonia to butadiene than just indicated can be used, best results appear to be obtained in this range. A molar ratio of 10:1 gives very good results.

It is also advantageous, in carrying out the reaction, to include a small quantity of water in the feed, for example, about 0.2 weight per cent based on the ammonia. The inclusion of this small proportion of water in the feed is effective in maintaining the activity of the catalyst. It may be that the active catalytic material is some equilibrium product between the metal itself and one or more of its oxides and the water may serve to help maintain the catalytic material in the proper state.

In general, the space velocity of reacting materials through the catalyst bed may be varied over a relatively wide range. Space velocities of about .25 (liquid cc./cc. catalyst/hour) for the butadiene give good results, but this is subject to wide variation from as little as 0.1 or even less up to about as much as 1.5 or 2, or even somewhat more. Among other factors which influence the selection of space velocity are the temperatures used, the activity of the catalyst and the pressure, but a selection of the optimum space velocity for any given set of processing conditions is readily made.

The products of the reaction include aliphatic nitriles, specifically acetonitrile, propionitrile and butyronitriles, particularly isobutyronitrile, derivatives boiling above 130° C. assumed to be 8 carbon atom pyridines, probably trimethyl pyridines, and hydrocarbons which appear to be polymers of butadiene, including 1-vinyl-cyclohexene 13 and higher boiling hydrocarbons. High yields of nitrogen-containing products, based on butadiene feed are readily obtained.

The invention will be illustrated by the following example, but it is not limited thereto.

*Example.*—A pelleted cobalt catalyst was prepared in accordance with the specific example of a catalyst of my application Serial No. 605,832, and the pelleted, but unreduced, catalyst was placed in a reaction chamber. It was reduced at 640° F. for five hours by passing in hydrogen at atmospheric pressure at the rate of 200 cu. ft./hour/liter of catalyst. This reduction was followed by an ammonia purge for 6 hours at 3000 lbs. per square inch and a space velocity of 1.0 (cc./hour/cc. catalyst). The butadiene feed stock consisted of a mixture of butadiene with commercial propane and contained 48% butadiene. The temperature in the reactor was maintained at 640° F., and the pressure at 1500 lbs. per square inch. The molar ratio of ammonia to olefin in the feed was approximately 15:1, and the ammonia contained 0.2 weight percent of water. The butadiene space velocity was .21 (cc./cc. catalyst/hour). The reaction product was collected, and stabilized to separate from it unreacted ammonia, and other products more volatile than acetonitrile. The resulting stabilized product contained 9.5% acetonitrile, 4.6% propionitrile, 3.7% isobutyronitrile, and 6.2% pyridines calculated as trimethyl pyridines.

I claim:
1. The process of preparing aliphatic nitriles and pyridines which comprises bringing a mixture consisting predominantly of butadiene and ammonia in molar proportions less than 1:5 at a temperature within the approximate range 500°–700° F. and at a pressure in excess of 500 pounds per square inch into contact with a catalyst effective to promote the reaction between butadiene and ammonia, said catalyst having as its active component a reduced oxide of a metal of the class consisting of cobalt and nickel.

2. The process as in claim 1 in which the mixture containing the butadiene and ammonia also includes a small amount of water vapor.

3. The process as in claim 1 in which the catalyst includes reduced cobalt oxide.

4. The process as in claim 1 in which the catalyst is a reduced cobalt oxide deposited on an inert carrier.

5. The process of preparing aliphatic nitriles and pyridines which comprises bringing a mixture consisting predominantly of butadiene and ammonia in molar proportions within the range of 1:5 to 1:15, at a temperature within the approximate range of 500°–700° F. and at a pressure in excess of 500 pounds per square inch into contact with a catalyst effective to promote the reaction between butadiene and ammonia, said catalyst having as its active component a reduced oxide of a metal of the class consisting of cobalt and nickel.

6. The process as in claim 5 in which the mixture containing the butadiene and ammonia also includes a small amount of water vapor.

JOHN W. TETER.

REFERENCES CITED

The following references are of record in the file of this patent:

UNITED STATES PATENTS

| Number | Name | Date |
|---|---|---|
| 2,386,135 | Morris | June 15, 1942 |
| 2,331,968 | Fourney | Oct. 19, 1943 |
| 2,363,903 | Smith | Nov. 28, 1944 |
| 2,367,621 | Schulze | Jan. 16, 1945 |
| 2,378,067 | Dorset | June 12, 1945 |
| 2,381,470 | Teter | Aug. 7, 1945 |
| 2,381,471 | Teter | Aug. 7, 1945 |
| 2,381,472 | Teter | Aug. 7, 1945 |
| 2,391,555 | De Simo | Dec. 25, 1945 |
| 2,450,637 | Denton | Oct. 5, 1948 |
| 2,450,642 | Denton | Oct. 5, 1948 |

FOREIGN PATENTS

| Number | Country | Date |
|---|---|---|
| 332,623 | Great Britain | 1929 |

OTHER REFERENCES

Bock, Chem. Abstracts, vol. 31 (1937), p. 3912.